Figure 1:
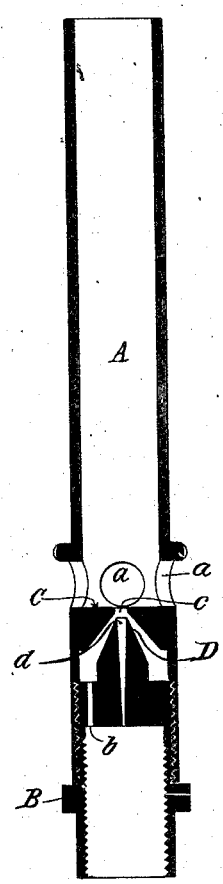
Figure 2:
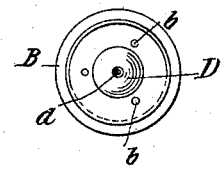

(No Model.)

J. F. BARKER.
GAS BURNER.

No. 575,318. Patented Jan. 19, 1897.

Witnesses:
Raphaël Netter
Sands F. Randall

John F. Barker Inventor
by Clarkson A. Collins Att'y.

THE NORRIS PETERS CO., PHOTO-LITHO., WASHINGTON, D. C.

UNITED STATES PATENT OFFICE.

JOHN F. BARKER, OF SPRINGFIELD, MASSACHUSETTS, ASSIGNOR TO THE GILBERT & BARKER MANUFACTURING COMPANY, OF MASSACHUSETTS.

GAS-BURNER.

SPECIFICATION forming part of Letters Patent No. 575,318, dated January 19, 1897.

Application filed August 7, 1896. Serial No. 601,937. (No model.)

*To all whom it may concern:*

Be it known that I, JOHN F. BARKER, a citizen of the United States, residing at Springfield, in the county of Hampden and State of Massachusetts, have invented certain new and useful Improvements in Gas-Burners, of which the following is a specification.

My invention relates to that class of gas-burners used for illuminating purposes in which the light is produced by the incandescence of a heated body or mantle; and the object of my improvements is to provide for the regulation of the gas to a constant quality at the burner under varying conditions of quality and pressure in the mains. As is well known, it is necessary in the operation of such burners to dilute the illuminating-gas supplied from the mains by the admixture of air to such an extent that only a blue or heating flame is produced. If the proportion of air supplied is insufficient, the gas will smoke, causing the mantle to become coated with soot and thus impairing its durability and efficiency, and if, on the other hand, too much air is mixed with the gas, so that the mixture approaches the explosive point, the mantle will be insufficiently heated and the flame will be disagreeably noisy. Since not only the quality of the ordinary illuminating-gas varies, but there is also a wide variation in the pressure of the gas at the burner, and consequently in the amount of gas supplied at the burner, some means of adjusting the relative proportions of air and gas in the mixture is required. This has heretofore been done by making the induction air-ports through which the air to be mixed with the gas is drawn in of variable capacity, so that the amount of air can be proportioned to the quality of the gas. This arrangement, however, is not altogether satisfactory, since, while it enables the adjustment of the quality of the gas within a certain limited range when the air-ports are opened to their full capacity, no further regulation is possible, and in case of a further enrichment of the gas or an increase in pressure, so that more gas is supplied at the burner, a smoky flame will result. Adjustment by partially closing the cock in the gas-pipe is not practicable, since by so doing the velocity of the gas at the burner-orifice is checked and the gas will escape at the air-ports on slight provocation, especially in the case of heavy gases, such as gasolene-gas. To obviate these difficulties and to provide means for the adjustment of the flame through any practicable range of pressure and quality of gas is the object of my improvements.

To this end I provide a rotary burner-pillar set upon a threaded base, which is attached to the gas-supply pipe. The burner-pillar is supplied with induction air-ports of fixed capacity and of such size that the amount of air drawn in will produce a proper mixture when gas of the poorest quality available for illuminating purposes, say a fifteen-candle-power gas, or of a given minimum of quality, is being freely supplied to the burner. The burner-pillar has a floor which is provided with a single central perforation for the admission of gas, which registers upon a needle-point supported by the base upon which the burner-pillar rotates, forming a needle-valve. The top of the base is provided around the needle-point with several small perforations, through which passes the gas from the supply-pipe. In order to permit the turning down of the gas-flame to a low point without manipulating the gas-cock, I provide a permanent passage of small capacity through or along the needle-point. This passage gradually increases in capacity from its lower to its upper opening, so that the fine stream of gas issuing therefrom will be expanded and lose its velocity and thus be prevented from impinging upon and causing the burning out of the wire-screen employed in such burners, as would be the case if the diameter of the passage was the same throughout.

In using the burner, so long as the minimum quality of gas to which the capacity of the air-ports is proportioned is supplied under a given pressure the burner-pillar remains screwed up on the base, so that the gas-port at the needle-point or valve is open to its full capacity and a proper mixture of gas and air is supplied without attention. In case of an enriching of the gas or of an increase in pressure, so that more gas is supplied, the burner-pillar is rotated so as to be screwed down on the base and partially close the gas-inlet. In this manner any increase in pressure or in the richness of the gas can be compensated for and the mixture of gas and air kept constant. Upon a decrease in pressure or in the richness of the gas the burner-pillar is rotated in the opposite direction, so as to open the gas-inlet more widely.

The device is illustrated in the accompanying drawing, which shows a vertical section thereof.

In the drawing, A indicates the burner-pillar, provided with the air-ports $a\ a\ a$. The burner-pillar A is supported upon the base B, upon the threaded portion of which it is adapted to rotate.

C is the floor of the pillar A, having the central orifice $c$, adapted to receive the needle-point D of the base B, around which are the orifices $b\ b\ b$ in the upper part of the base. The stream of gas passing up over the cone of the needle-point and thence through the orifice $c$ has a rotary motion imparted to it and enters the pillar as a spray, which practically fills the pillar and acts as a piston on a larger area of air than the streams of gas as they enter from the ordinary perforations, whereby the air is more effectively drawn in through the air-ports.

Through the needle D and terminating at the point thereof is the passage $d$, which is permanently open and serves to give a supply of gas to the burner when the pillar A is turned entirely down and it is desired to maintain a small flame. In order to prevent the burning out of the wire netting or screen employed in such burners, which would be the result of the impingement thereupon of a small jet of gas under a high velocity, the diameter of the passage $d$ increases slightly from its upper opening, so that the jet of gas issuing therefrom is expanded in the burner-pillar and its velocity checked.

In such a burner not only is the range of regulation wider and the regulation more exact than in those having a gas-inlet of fixed capacity and adjustable air-ports, but the manipulation of the device is much easier, a simple rotation of the burner-pillar, which can easily be done with one hand, being all that is required to adjust or lower the flame or to turn it down to a point so low as to simply maintain combustion without giving illumination.

What I claim as new, and desire to secure by Letters Patent, is—

1. In an incandescent gas-burner, the combination of a base having a perforated needle-point and perforations around such needle-point and a burner-pillar adapted to rotate and move vertically upon said base and provided with induction air-ports of fixed capacity and with a floor having a single perforation adapted to receive the needle-point of the base, substantially as and for the purposes set forth.

2. In an incandescent gas-burner, the combination of a fixed base, a burner-pillar adapted to rotate and move vertically upon the base, air-ports of fixed capacity in the burner-pillar, a needle-point carried by the base, an opening in the floor of the burner-pillar adapted to receive the needle-point and to be closed by the downward motion of the burner-pillar upon the base and a permanently-open gas-passage, the capacity of which increases upwardly, through the needle-point to the burner-pillar substantially as and for the purposes set forth.

In testimony whereof I have hereunto subscribed my name this 16th day of March, A. D. 1896.

JOHN F. BARKER.

Witnesses:
T. M. BROWN,
W. T. RAYNER.